(12) United States Patent
Colorado et al.

(10) Patent No.: US 6,897,787 B2
(45) Date of Patent: May 24, 2005

(54) METHOD AND APPARATUS FOR COMPOSING AN ILLUMINATION PATTERN

(75) Inventors: Rafael Colorado, Grayslake, IL (US); Roger Bye, Lindenhurst, IL (US)

(73) Assignee: Motorola, Inc., Schaumburg, IL (US)

( * ) Notice: Subject to any disclaimer, the term of this patent is extended or adjusted under 35 U.S.C. 154(b) by 112 days.

(21) Appl. No.: 10/329,089

(22) Filed: Dec. 23, 2002

(65) Prior Publication Data

US 2004/0119601 A1 Jun. 24, 2004

(51) Int. Cl.$^7$ ................................................ G08B 5/00
(52) U.S. Cl. .................. 340/815.4; 340/7.51; 340/7.55; 455/566; 455/575.1; 315/131; 315/132; 315/133; 349/61; 349/69; 349/83
(58) Field of Search .......................... 340/815.4, 7.51, 340/7.55, 309.2, 307.5, 7.54; 315/131, 132, 133; 349/61, 69, 83; 455/566, 575.1

(56) References Cited

U.S. PATENT DOCUMENTS

| | | | |
|---|---|---|---|
| 5,087,906 A | | 2/1992 | Eaton et al. |
| 5,946,636 A | * | 8/1999 | Uyeno et al. ............... 455/566 |
| 6,035,180 A | * | 3/2000 | Kubes et al. ............ 455/575.1 |
| 6,418,323 B1 | | 7/2002 | Bright et al. |
| 6,608,996 B1 | * | 8/2003 | Laurikka et al. ........... 340/7.55 |
| 6,720,863 B2 | * | 4/2004 | Hull et al. ................. 340/7.51 |
| 2004/0125946 A1 | * | 7/2004 | Sung ..................... 379/428.01 |

OTHER PUBLICATIONS

Mobile Phone GSM/SGH–R210 Http://www.samsungelectronics.com/mobile_phone/wireless_terminals.
Motorola V66 Phone for T–Mobile http://commerce.motorola.com/cgi–bin/ncommerce3/ProductDisplay?.
Motorola Interchangeable Bezels Vale Pack—98378 http://commerce.motorola.com/cgi–bin/ncommerce3/P.
Nokia 8290 Phone http://www.nokiausa.com/phones/8290.
Nokia 8290 Phone Covers http://www.nokiausa.com/phones/8290/1,5258,colors:1,00.html.

* cited by examiner

*Primary Examiner*—Daniel Wu
*Assistant Examiner*—Samuel J. Walk
(74) *Attorney, Agent, or Firm*—Vedder, Price, Kaufman & Kammholz, P.C.

(57) ABSTRACT

A method and apparatus for composing an illumination pattern includes a user interface (102) capable of receiving input commands (106), wherein the input commands (106) are directed to the selection of at least one illumination region (148, 150, 152 and 154). The method and apparatus further includes a processor (104) coupled to the user interface (102) to receive the user input (106) and thereupon generate input signals (108), which provided to the processor (104). The processor (104), in response to the input signals (108) thereupon generates an illumination pattern, wherein illumination pattern includes a plurality of illumination commands for a selected region (240), a selected color (244) for the selected region (240), and a timing (246) for the illumination of the selected region (240) at the selected color (244).

26 Claims, 5 Drawing Sheets

METHOD AND APPARATUS FOR COMPOSING AN ILLUMINATION PATTERN

BACKGROUND OF THE INVENTION

The invention relates generally to a portable electronic device and more specifically to the personalization of the electronic device through the composition of an illumination display pattern.

With the growth of portable devices, such as wired or wireless devices, such as a cellular phone, a personal digital assistant, a smart phone, a laptop computer, a desktop computer or any other suitable device for providing electronic user interaction, there is a concurrent growth to provide for the personalization of these portable devices.

One common approach to personalization of a portable device is providing interchangeable covers, or faceplates. For example, the Nokia 8290 cellular phone manufactured by Nokia, provides the user the ability to place different faceplates having different colors or patterns on the phone. Thereupon, the user may personalize his or her cellular phone based on the chosen faceplate. Other physical distinctions are also available, such as the Motorola V.66 cellular phone available from Motorola, Inc., which allows for interchangeable face clips on a top portion of the phone.

Another common approach to personalization are specific ring tones audibly displayed by the phone to notify an incoming signal, such as a incoming call, a voicemail message or any other type of notification. Currently, many portable devices provide the user with an internal library of available ring tones. The user may selectively associate specific ring tones with specific incoming signals to provide differentiation. Moreover, a user may associate a specific ring tone with a particular caller identifier. Furthermore, there exists the commercial opportunity for the user to purchase selective ring tones from commercial internet-based websites, wherein the ring tones may then be seamlessly downloaded to the phone for the user's enjoyment. Also, some portable devices also provide for a composer, allowing a user to compose a personalized ring tone consisting of selected tones.

An emerging area of personalization in portables devices is the selective illumination of an illumination region, such as one or more light emitting diodes (LEDs), visible on the surface of the portable device. Another example of an illumination region is a light channel, as described in U.S. Pat. No. 5,087,906. For example, the Samsung R210 available from Samsung, Inc. provides for a single LED disposed on the front surface, wherein the single LED illuminates the single color red to signify an incoming signal, such as an incoming call. Another example is the Motorola T195 available from Motorola, Inc., which provides for an illuminating keypad that lights up in a single color when the phone is activated. Yet another example are commercially available Nokia compliant faceplates that have multiple LEDs that flash in a non-sequential manner.

As such, the currently available illumination patterns are restricted by the random operation of LEDs disposed about the portable device or the direct operation a timid illumination region in direct response with a portable device activity, and the color and frequency of illumination is restricted by predefined illumination routines.

BRIEF DESCRIPTION OF THE DRAWINGS

The described embodiments will be more readily understood with reference to the following drawings, wherein.

DETAILED DESCRIPTION OF THE DRAWINGS

Generally, a method and apparatus for composing an illumination pattern includes the steps of receiving a region indicator, wherein a region indicator indicates which one or more of multiple illumination regions is/are to be selected. The method and apparatus further includes receiving a color indicator, wherein the color indicator indicates a selected color for the selected region. In one embodiment, the region indicator and the color indicator are entered through a user interface and provided to a processor. Thereupon, a timing indicator is also received from the user interface, wherein the timing indicator indicates the timing of the illumination of the selected color of the selected region.

The method and apparatus further includes generating an illumination pattern for a portable device, based on the entered region indicator, the color indicator and the timing indicator. The illumination pattern may, for exemplary purposes only, be stored in a memory device, provided to an illumination processor for being executed, associated with a particular activity of the portable device or attached to a message or other electronic document.

Figure 1:
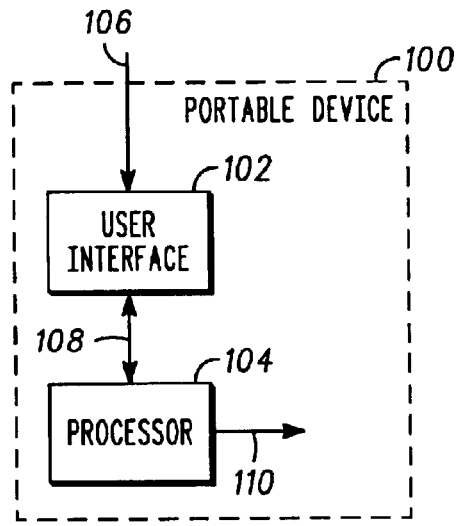
FIG. 1 illustrates an example of a portable device capable of composing an illumination pattern.

More specifically, FIG. 1 illustrates a portable device 100, as discussed above, which includes a user interface 102 and a processor 104. The user interface 102 may be a keypad, navigation buttons, audio input interface, peripheral device component connection slot, such as an interface for an add-on keyboard, or any other suitable interface for providing user input as recognized by one having ordinary skill in the art. The processor 104 may be, but not limited to, a single processor, a plurality of processors, a DSP, a microprocessor, an ASIC, a state machine, or any other implementation capable of processing and executing software or discrete logic or any suitable combination of hardware, software and/or firmware. The term software should not be construed with or referred to exclusively to hardware capable of executing software, and may implicitly include DSP hardware, ROM for storing software, RAM, and any other volatile or non-volatile storage medium.

A user input 106, typically provided from an end user is received by the user interface 102. The user interface 102 thereupon generates input signals 108, which consist of codification of the user input 108 such that the processor 104 may actively receive and interpret the user input 106. As recognized by the one having ordinary skill in the art, the input signals 108 may be any suitable encoding or manipulation of the user input 106 such that the processor 104 may decode the input and thereupon process the input signals 108.

The processor 104, in response to the input signals 108, generates an illumination pattern 110. The illumination pattern 110 includes multiple parameters received via the user interface 102, wherein the parameters are directed to the selective illumination of multiple illumination regions (not shown). In one embodiment, the illumination pattern contains an initialization tag and one or more illumination tags having multiple elements. For example, the illumination tag may be encoded including a Threshold (element A, element B, element C) and a Frequency (element A, element B, element C). In the threshold tag, element A may represent a selected illumination region on the portable device, element B may represent a selected color and element C may represent a threshold value. In the frequency tag element A may represent a region, element B may represent a minimum value for range and element C may represent a maximum value for the range. As such, in response to the user input 106, the processor 104 compiles and generates the illumination pattern 110 wherein illumination pattern is represented by a comparison of the threshold, typically expressed in decibels, with respect to frequency, typically expressed in hertz. For example, a particular frequency may represent a particular illumination region and a particular amplitude (threshold) may represent a particular illumination color.

FIG. 1 illustrates the portable device 100 having the user interface 102 and the processor 104 disposed therein. As recognized by one having ordinary skill in the art, the portable device 100 may contain further elements, which have been omitted for clarity purposes only. As discussed below, the portable device 100 may contain multiple illumination regions, but it is also within the scope of the embodiment that the portable device not contain any illumination regions, but may provide for the composition of the illumination pattern for transmission to a portable device having multiple illumination regions. The portable device 100 may transmit the composed illumination pattern with communication information.

Figure 2:
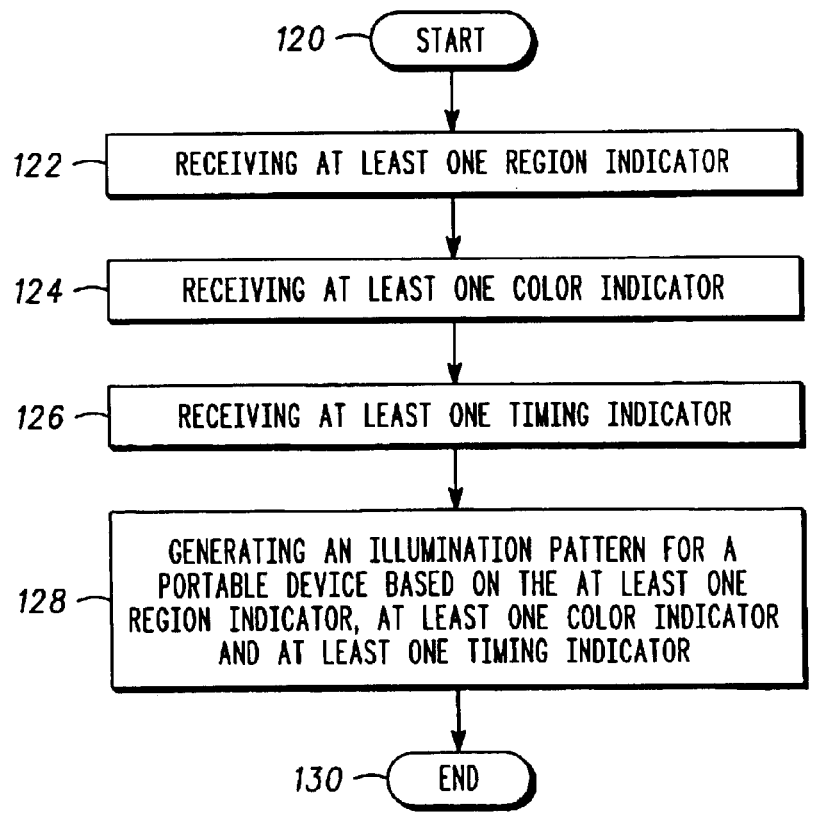
FIG. 2 illustrates an example of the steps of a method for composing an illumination pattern.

FIG. 2 illustrates the steps of the operation of the portable device 100 of FIG. 1 for composing the illumination pattern 110. The method begins 120 by receiving one or more region indicators, step 122. In one embodiment, through the user interface 102, this may include the input of a number that is associated with a particular region, an interactive display with a portable device having multiple illumination regions, wherein the portable display displays different regions and the user selects the region based upon display, a graphical representation of the portable device and graphical representation of specific region illumination and selection based upon the graphical illumination, an alpha or numeric list of various regions and the user enters or selects the region(s) from the list, or any other suitable input that indicates which one of the possible illumination regions are to be selected. As recognized by one having ordinary skill in the art, the region indicator may indicate one or more illumination regions.

The method continues by receiving a color indicator, at step 124. The color indicator may include a number that represents a particular shade, a graphical interface wherein a user may chose a color based on an adjustable graphics display of the various color options, an alpha or numeric list of available color options for the selected illumination region, or any other suitable indicator that may be recognized by the processor as a selected color and thereupon associated with the illumination region. The next step, step 126, is receiving a timing indicator from the user interface. Similar to the color indicator, the timing indicator maybe a number input that represents a particular timing for illuminating the illumination region, a graphical interface wherein a user may chose a time interval based on an adjustable graphics display of the available timing options for the selected illumination region, an alpha or numeric list of available timing intervals for the selected illumination region, or any other suitable indicator that may be recognized by to processor as selected timing intervals and thereupon associated with the illumination region.

In response to the region indicator, the color indicator and the timing indicator, an illumination pattern may be generated for a portable device, step 128. The illumination pattern includes, in one embodiment, a mark-up encoding of at least one tag designating a selected illumination region, a selected color for the illumination region, and a selected illumination timing for the selected region. Thereupon, the method is complete 130.

Figure 3:
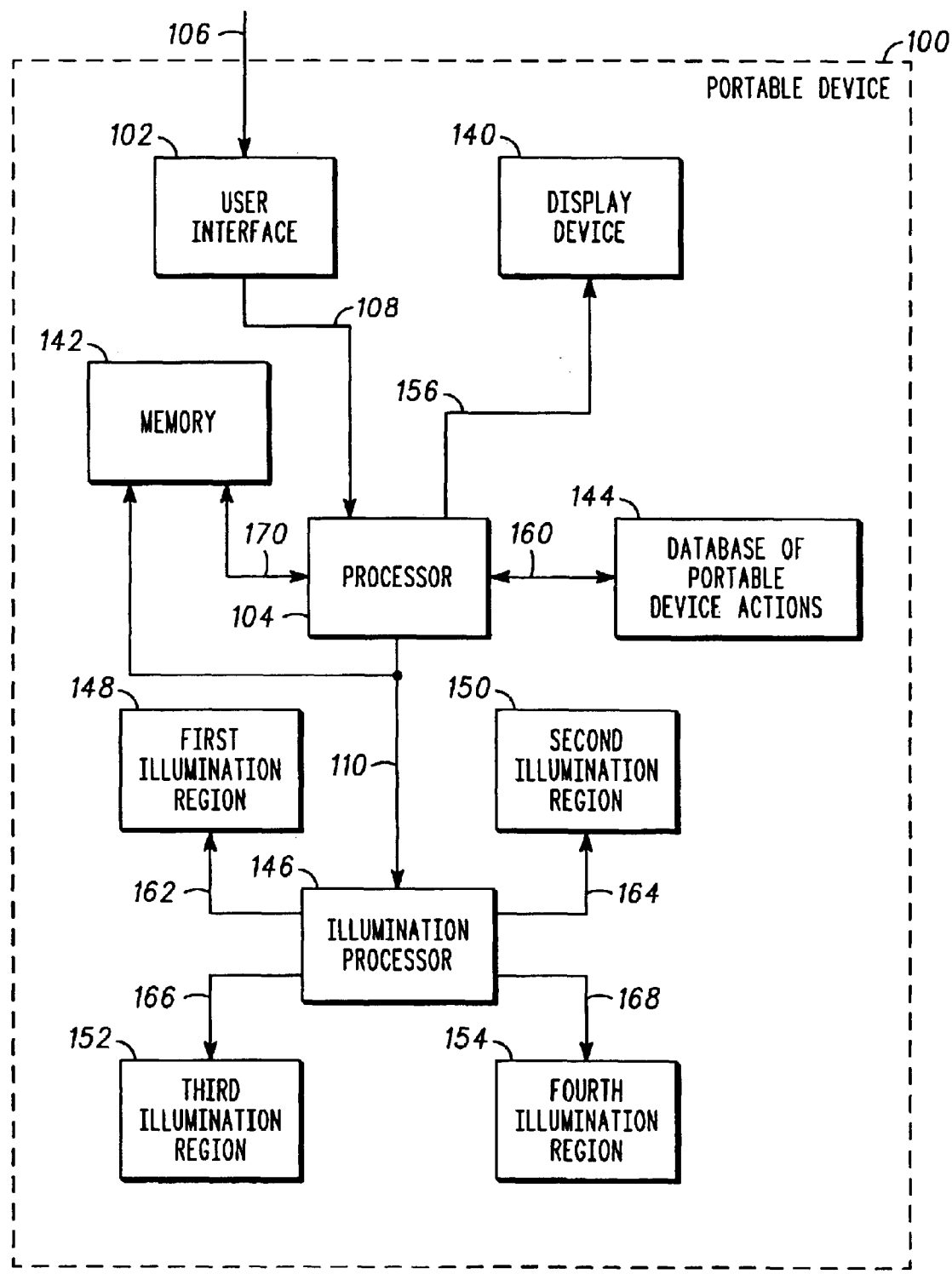
FIG. 3 illustrates another example of the portable device capable of composing an illumination pattern.

FIG. 3 illustrates another embodiment of the portable device 100 having the user interface 102, the processor 104, wherein the user interface 102 receives the user input 106 an thereupon generates the input signals 108. The processor 104 is operably coupled to a display device 140, which may be any device capable of providing an output display, such as a liquid crystal display (LCD), an interface to a monitor, such as video graphics adaptor (VGA) monitor, a speaker or any other suitable output device as recognized by one having ordinary skill in the art.

The processor 104 is also operably coupled to a memory 142 and a database 144 of portable device actions. The memory 142 and/or the database 144 may be, but not limited to, a single memory, a plurality of memory locations, shared memory, CD, DVD, ROM, RAM, EEPROM, optical storage, or any other non-volatile storage medium capable of storing digital data for use by the processor 104. As recognized by one having ordinary skill in the art, the database 144 may be disposed within the memory 142, but is illustrated separately for clarity purposes only. Also, the database 144 includes the possible actions that the portable device may perform, such as in the example of the portable device being a cellular phone, the actions may include, but not limited to, receiving an incoming call, receiving an incoming message or a calendar alarm.

The processor 104 is also coupled to an illumination processor 146. As recognized by one having ordinary skill in the art, the processor 104 may include the illumination processor 146 therein, but due to pin limitations for powering multiple illumination regions, one embodiment provides for separate processors 104 and 146. The illumination processor 146 is operable coupled to four illumination regions, 148–154. As discussed above, the illumination regions may include one or more LEDs, a backlight, a fiber optic channel, or any other means for illuminating a region.

In the embodiment of FIG. 3, the composition of the illumination pattern may be performed in accordance with the steps of FIG. 2 within the prescribed parameters of the portable device. The composition processor may utilize the processor 104 providing instructions 156 to the display device to assist the end user in composing the illumination pattern. The processor 104 may further store the generated illumination pattern in the memory 142 or may provide the illumination pattern 110 to the illumination processor 146. Furthermore, in this embodiment, through instructions 156 from the display device 140 and input signals 108 from the user interface 102, the processor 104 may further include an association within the illumination pattern 110 with a portable device action 160 provided from the database 144.

Moreover, when the illuminator processor 146 receives the illumination pattern 110, the processor reads the instructions within the illumination pattern 110 and provides illumination signals 162–168 to the illumination regions 148–154, respectively. Based on the illumination pattern 110, the illumination processor 146 may provide illumination signal 162 to the first illumination region 148, directing the first illumination region to illuminate in a first color for a first period of time, frequency. The illumination processor 146 may then provide the illumination signal 166 to the third illumination region 152 to illuminate in a second color for a second period of time, frequency. The illumination processor 146 may continue to provide illumination signals 162–168 until the full illumination composition 110 has been executed such as described in co-pending U.S. Patent Application entitled "Apparatus for Displaying an Illumination Pattern and Method Thereof," having a filing date of Dec. 23, 2002 and Ser. No. 10/329,091.

Figure 4:
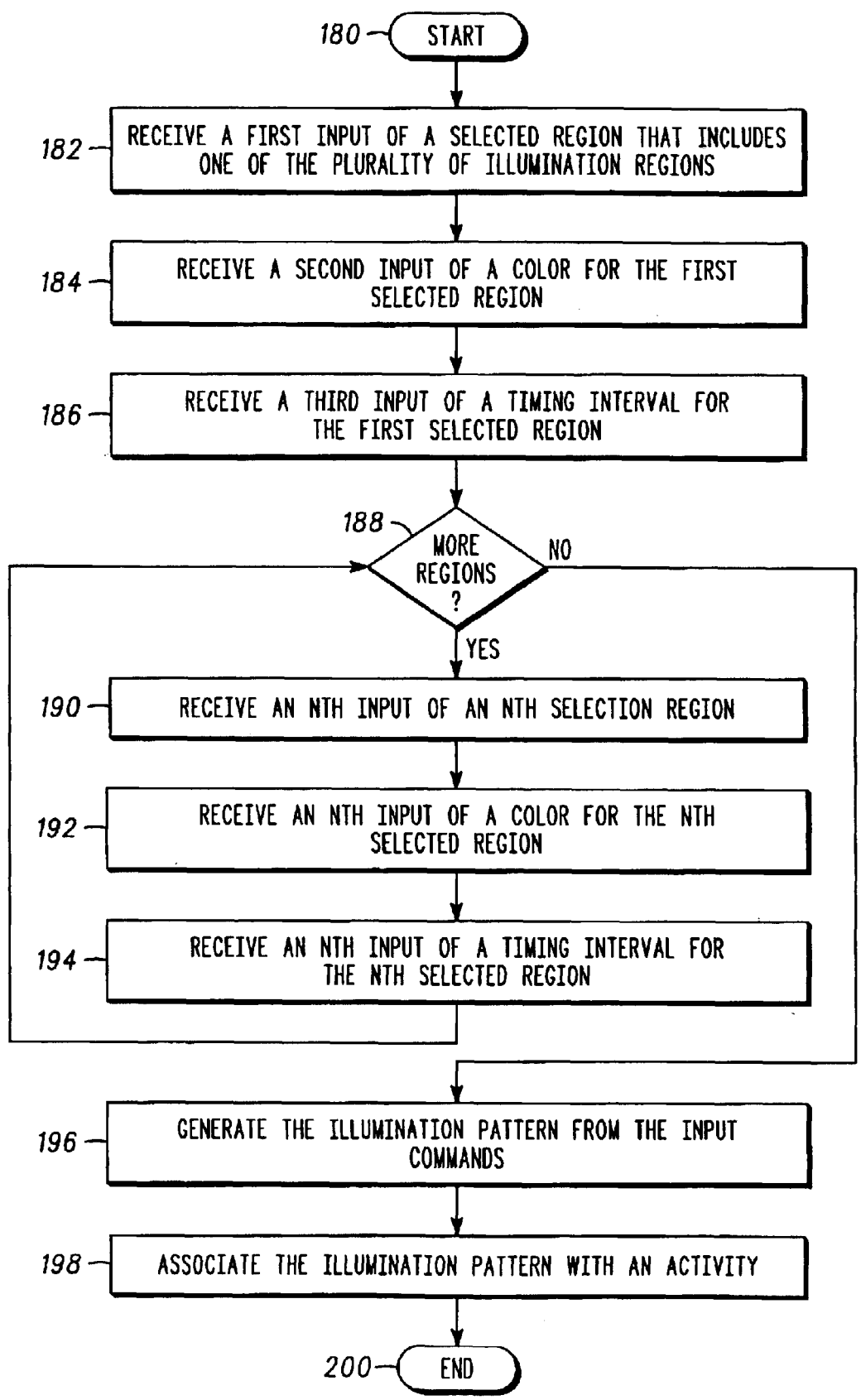
FIG. 4 illustrates another example of the steps of a method for composing the illumination pattern.

FIG. 4 illustrates the steps of a flow chart of an example of a method for composing an illumination pattern. With reference to FIG. 3, this method may be performed by the portable device 100, wherein the steps are executed by the processor 104, in response to executable instructions 170 from the memory 142. In one embodiment, the processor 104 provides instructions 156 to the display device 140 and thereupon receives input signals 108 through the user interface 102.

The method begins wherein the processor receives a first input of a selected region, wherein the selected regions includes at least one region, but may include any combination of multiple regions, step 182. The processor thereupon receives a second input of a color for the first selected region 184. As discussed above, the color may be any color of which the illumination regions are capable of providing illumination. The processor thereupon receives a third input of a timing interval for the first selected region, step 186.

Thus, for the first selected region, input parameters for determining the illumination signal (such as 162–168 of FIG. 3) are received. The next step includes a determination of whether there are any more regions to be selected for illumination, step 188. In one embodiment, this may include an instruction 156 asking an end user if there are any more regions to be selected.

If there are more regions to be selected, the next step is the processor receives a fourth input for a second selected region, step 190. For illustration purposes, the steps of the flowchart include the representation of an nth selected region which is provided to indicate that multiple number of selected regions may be selected for composing the illumination pattern. Similar to step 184 and 186, a color input and a timing input for the second selected region may be received as fifth and sixth input, respectively, steps 192 and 194, respectively. Thereupon, for the second selected region, input parameters for determining the illumination signal (such as 162–168 of FIG. 3) are received. Furthermore, in one embodiment, a seventh input may be received that includes an inter-region timing signal for indicating the timing between the first and second selected regions.

Once again, a determination is made if more regions are to be selected for the composition of the illumination pattern, step 188. If yes, steps 190–194 are executed for a third selected region and continuing through decision step 188 for each nth selected region until the result of decision step 188 is that there are no more selected regions.

When no more regions are to be selected, the processor may thereupon generate the illumination pattern from the various input commands, step 196. In another embodiment, the processor may continually generate the illumination pattern in conjunction with the performance of steps 182–186 and steps 190–194. The illumination pattern includes tags for the generation of illumination signals by the illumination processor 196, including a tag to the selected illumination region, the color of the illumination region and the timing of the illumination of the illumination region.

In one embodiment, the processor may further associate the illumination pattern with an activity of the portable device, step 198. As illustrated with respect to FIG. 3, the processor 104 may access the database 144 and provide instructions 156 for the user to selectively associate the illumination pattern 110 with a portable device activity, through an input signal 108 from the user interface 102. Thereupon, the method is complete 200.

Figure 5:
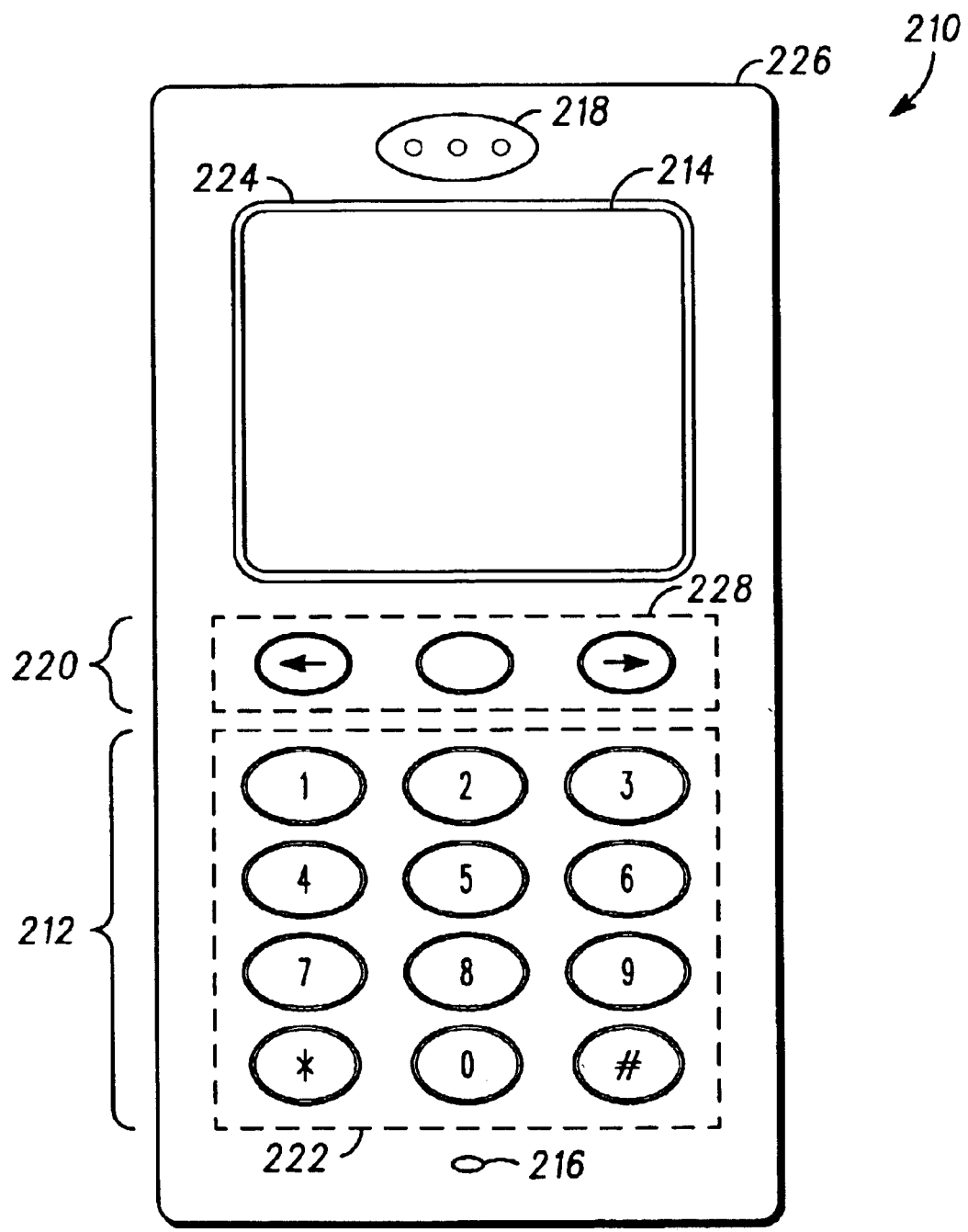
FIG. 5 illustrates another example of the portable device capable of composing an illumination pattern.

FIG. 5 illustrates an example of a portable device 210 having a number keypad 212, a display screen 214, voice receiver 216, a speaker 218 and a navigational pad 220. With reference to FIG. 3, the portable device 210 may include the user interface 102 being the number keypad 212, the voice receiver 216 or the navigational pad 220 and the display device 140 being either the monitor 214 or the speaker 218. Not visible, the portable device 210 includes a processor, similar to processor 104, capable of receiving input signals, such as 108, and thereupon composing an illumination pattern.

The portable device 210 further includes four illumination regions, a keypad region 222, a display region 224, a perimeter region 226 and a navigation button region 228. As recognized by one having ordinary skill in the art, the portable device (e.g. phone) 210 may include further illumination regions, such as sub-regions within the designated regions, for example a pattern of keypad buttons. In one embodiment, each keypad button may be designated as a separate illumination region, or a plurality of buttons may be grouped together, to be considered a specific illumination region.

Figure 6:
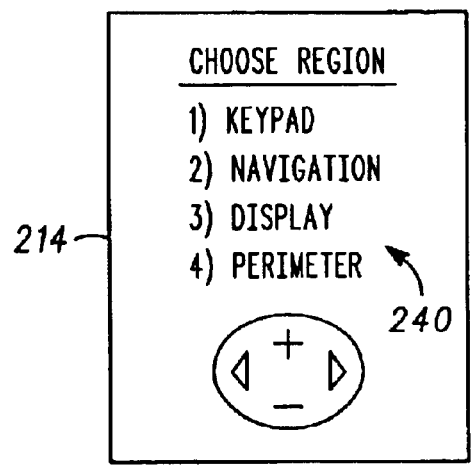
FIG. 6 illustrates an example of a display of an illumination pattern composition graphical menu.

FIG. 6 illustrates an example of the display 214 from the portable device 210 of FIG. 5. The display 214 displays a menu list 240 whereupon a user may select an illumination region. Within the display 214, is a graphical representation of a navigation menu 242, which corresponds to the navigation buttons 228 of the portable device 210 of FIG. 5. In this embodiment the user may navigate up and down the menu list 240 using the navigation buttons 228, as represented by the graphical display of the navigation controls, 242. As recognized by one having ordinary skill in the art, the navigation display 242 represents a graphical representation of the buttons that a user may select within the navigation bar on the portable device, such as navigational bar 228. Using the plus or minus buttons, the user may select one or more regions from the menu list 240. Thereupon, when the regions have been selected, the user may depress the right arrow to generate the display of FIG. 7.

Figure 7:
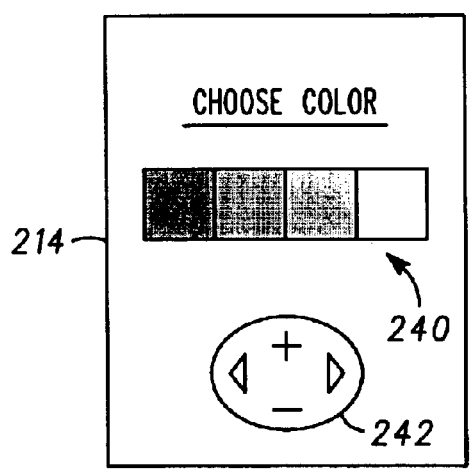
FIG. 7 illustrates an example of another display of a illumination pattern composition graphical menu.

FIG. 7 illustrates the display 214 of the portable device 210 of FIG. 5 having an option screen for choosing a particular color 244 of the selected region(s). Once again, the display 214 includes the graphical representation of the navigational menu 242, wherein the user may depress the plus or minus navigational keys to select the appropriate color from the spectrum of available colors, as illustrated within the menu 244. Thereupon, once the color for the selected region has been chosen, the user may depress the right arrow button of the navigational bar, such as 228 of FIG. 5, to generate the screen illustrated in FIG. 8.

Figure 8:
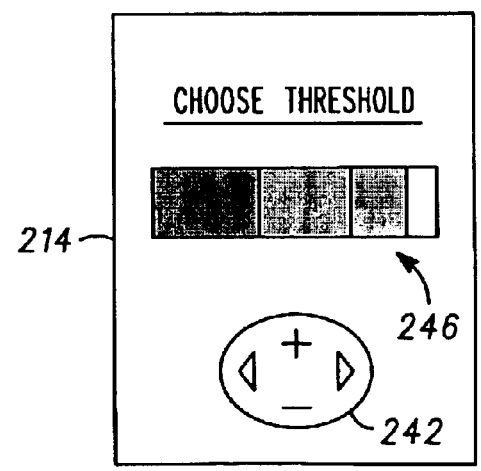
FIG. 8 illustrates an example of another display of a illumination pattern composition graphical menu.

FIG. 8 illustrates the display 214 of the portable device 210 of FIG. 5. On the display 214 is a threshold menu 246 and the graphical representation of the navigational menu 242. The user, by depressing navigational buttons, such as 228 of FIG. 5, selects the threshold for the illumination of the selected illumination region wherein, as discussed above, the frequency may be used to determine an illumination color with respect to an entered threshold. Once again, the user may thereupon select the right arrow of the navigational menu to complete the input process for one of the selected steps in the composition of an illumination pattern.

With respect back to the discussion of FIG. 3, the depression of the different navigational buttons is provided as the user input 106 and the user interface 102 provides the input signals 108 to the processor 104. Thereupon, the processor 104 may generate the illumination pattern 110.

In another embodiment, the composition of an illumination pattern may further include the input of an inter-region indicator. An inter-region indicator includes an input provided between selected illumination regions, wherein a frequency of no illumination is selected, to provide a break in illumination between different steps of the illumination pattern. In one embodiment, the inter-region indicator may be a timing indicator, wherein the processor 104 may encode the inter-region indicator having a tag line and a single sub-element, wherein the single sub-element indicates a period of time where no illumination signals are provided from the illumination processor 146.

It should be understood that there exists other implementations of other variations and modifications of the invention and its various aspects, as may be readily apparent of those of ordinary skill in the art, and that the invention is not limited by the specific embodiment described herein. For example, utilizing a recognized encoding format, the specific region, color and timing parameters may be directly inputted to the processor, instead of using a graphical user interface, such that the processor may directly compile and generate the illumination pattern. It is therefore contemplated and covered by the present invention, any and all modifications, variations or equivalents that fall within the spirit and the scope of the basic underlying principles disclosed and claimed herein.

What is claimed is:

1. A portable device comprising:
   a user interface capable of receiving a user input, wherein the user input is directed to the selection of one of a plurality of illumination regions and selected illumination timing for each selected illumination region and the user interface thereupon generates an input signal; and
   a processor operably coupled to receive the input signal and thereupon generate an illumination pattern among the selected illumination regions, wherein the illumination pattern is associated with one portable device action.

2. The portable device of claim 1 farther comprising:
   a memory capable of storing at least one illumination pattern, wherein the illumination pattern defines at least one region color and an illumination frequency; and
   the plurality of illumination regions.

3. The portable device of claim 2, wherein the user defined illumination pattern includes at least a plurality of region indicators, at least one color indicator and at least one timing indicator for each selected illumination region.

4. The portable device of claim 1 wherein the plurality of illumination regions include at least one of the following: a perimeter region, a display region, a keypad region and a navigation button region.

5. The portable device of claim 1 further comprising:
   a central processor capable of associating at least one of the plurality of illumination patterns with a portable device action, wherein the portable device action includes at least one of the following: receiving an incoming message, receiving an incoming call, detecting external sound.

6. The portable device of claim 1 wherein the illumination region includes at least one light emitting diode capable of producing a plurality of colors in response to the region color.

7. A method for composing an illumination pattern comprising:
   receiving at least one region indicator to indicate a plurality of selected illumination regions;
   receiving at least one color indicator;
   receiving at least one timing indicator for each selected illumination region; and
   generating an illumination pattern for a portable device action based on the at least one region indicator, the at least one color indicator and the at least one timing indicator.

8. The method of claim 7 further comprising
   receiving an inter-region indicator; and
   generating the illumination pattern including the inter-region indicator.

9. The method of claim 7 further comprising:
   storing the illumination pattern within a memory device.

10. The method of claim 7 further comprising:
    associating the illumination pattern with a portable device activity.

11. The method of claim 7 wherein the illumination pattern may be transmittable with communication information.

12. An apparatus for composing an illumination pattern comprising:
    a display device such that the display device displays an illumination pattern composer menu;
    a plurality of illumination regions; and
    an input device capable of receiving a user input including selected illumination timing through the illumination pattern composer menu to create an illumination pattern providing for the selective illumination among at least one of the plurality of illumination regions according to one portable device action.

13. The apparatus of claim 12 further comprising:
    a memory capable of storing the illumination pattern; and
    a processor operably coupled to the memory such that the processor may provide for the display of the illumination pattern.

14. The apparatus of claim 12, wherein the illumination pattern composer menu requests a first input selection for a first selected region which includes at least one of the plurality of illumination regions, the illumination pattern composer requests a second input selection for a color of the first selected region and a third input selection for a threshold of the first selected region.

15. The apparatus of claim 14, wherein the illumination pattern composer menu requests a fourth input selection for selecting a second selected region which includes at least one of the plurality of illumination regions and the illumination pattern composer menu requests a fifth input selection for selecting a threshold between the first selected region an the second selected region.

16. The apparatus of claim 12, wherein the display device and input device are disposed within a portable device.

17. The apparatus of claim 12 wherein illumination regions include at least one of the following: a perimeter region, a display region, a keypad region and a navigation button region.

18. An apparatus for composing an illumination pattern comprising:
   a user interface capable of receiving at least one input command;
   a memory device storing executable instructions; and
   a processor that composes the illumination pattern associated with one portable device activity, wherein the processor, in response to the executable instructions:
      receives a first input of a first selected region which includes at least one of a plurality of illumination regions;
      receives a second input of a color for the first selected region; and
      receives a third input of a timing indicator for the first selected region.

19. The apparatus of claim 18 wherein the processor, in response to the executable instructions:
   receives a fourth input of a second selected region which includes at least one of the plurality of illumination regions;
   receives a fifth input of a color for the second selected region;
   receives a sixth input of a timing for the second selected region; and
   receives a seventh input of an inter-region timing between the first selected region and the second selected region.

20. The apparatus of claim 19 wherein the user interface, the memory device and the processor are disposed within a portable device and once the illumination pattern has been composed, the processor, in response to the executable instructions: associates the illumination pattern with the portable device activity.

21. The apparatus of claim 18 further comprising:
   a transmitter operable coupled to the processor such that the composed illumination pattern may be transmitted with communication information.

22. The apparatus of claim 18 wherein the at least three illumination regions include at least one of the following: a perimeter region, a display region, a keypad region and a navigation button region.

23. A portable device comprising:
   a user interface capable of receiving a user input, wherein the user input is directed to the selection of one of a plurality of illumination regions including at least one of: a perimeter region, a display region, a keypad region and a navigation button region, and selected illumination timing for each selected illumination region and in response, the user interface thereupon generates an input signal; and
   a processor operably coupled to receive the input signal and thereupon generate an illumination pattern to selectively illuminate, according to the selected illumination timing, the selected illumination regions, wherein the illumination pattern is associated with one portable device action.

24. The portable device of claim 23 wherein the portable device action includes at least one of the following: receiving an incoming message, receiving an incoming call, detecting external sound.

25. The portable device of claim 23 wherein the processor is operable to generate the illumination pattern during the portable device action.

26. The portable device of claim 1 wherein the processor is operable to generate the illumination pattern during the portable device action.

* * * * *